United States Patent [19]
Matsui et al.

[11] 3,938,959
[45] Feb. 17, 1976

[54] CATALYST-TYPE EXHAUST GAS PURIFYING DEVICE

[75] Inventors: Kazuma Matsui, Toyota; Shigeo Hoshino, Kariya; Sigeru Kamiya, Toyohashi, all of Japan

[73] Assignee: Nippon Soken, Inc., Nishio, Japan

[22] Filed: Oct. 12, 1973

[21] Appl. No.: 406,107

[30] Foreign Application Priority Data
Oct. 20, 1972 Japan............................ 47-105651

[52] U.S. Cl........................... 23/288 FC; 252/477 R
[51] Int. Cl.².......................... B01J 8/00; F01N 3/15
[58] Field of Search....... 23/288 F, 288 FC; 60/299; 252/477 R; 423/213.2

[56] References Cited
UNITED STATES PATENTS

| | | | |
|---|---|---|---|
| 3,189,418 | 6/1965 | Gary................................... | 23/288 F |
| 3,404,965 | 10/1968 | Shiller............................... | 23/288 F |
| 3,441,381 | 4/1969 | Keith et al......................... | 23/288 F |
| 3,503,714 | 3/1970 | Lang.................................. | 23/288 F |
| 3,597,165 | 8/1971 | Keith et al......................... | 23/288 F |
| 3,770,389 | 10/1973 | Kitzner et al..................... | 23/288 F |
| 3,771,967 | 11/1973 | Nowak .............................. | 23/288 F |
| 3,785,781 | 1/1974 | Hervert et al..................... | 23/288 F |
| 3,798,006 | 3/1974 | Balluff............................... | 23/288 F |
| 3,801,289 | 4/1974 | Wiley ............................... | 23/288 F |
| 3,841,842 | 10/1974 | Wiley ............................... | 23/288 FC |
| 3,852,042 | 12/1974 | Wagner........................... | 23/288 FC |
| 3,854,888 | 12/1974 | Frietzsche et al................ | 23/288 FC |

*Primary Examiner*—Barry S. Richman
*Attorney, Agent, or Firm*—Cushman, Darby & Cushman

[57] ABSTRACT

A catalyst-type exhaust gas purifying device utilizing a monolithic catalyzing element defining a plurality of exhaust gas passages therein. The catalyzing element is disposed within a cylindrical housing. Heat insulating spaces are provided by at least one circumferential row of bores disposed near the outer periphery of said catalyzing element and closed at the opposite ends.

3 Claims, 3 Drawing Figures

CATALYST-TYPE EXHAUST GAS PURIFYING DEVICE

BACKGROUND OF THE INVENTION

This invention relates to a catalyst-type exhaust gas purifying device for use in internal combustion engines which are mounted in automobiles or the like.

Heretofore, there have been known many types of exhaust gas purifying devices for removing especially harmful components in an exhaust gas, such as carbon monoxides, non-burnt hydrocarbons and nitrogen oxides, from internal combustion engines. As one type of such devices, there have been known exhaust gas purifying devices utilizing catalysts. As the latter type of devices, there has been generally known a device in which so-called pellet type catalyzers each consisting of a pellet carrier and metal catalyst carried thereon are stratified within a metal housing. In this device, an exhaust gas is passed between the layers of the stratified pellet type catalyzers and is subjected to chemical reaction while being passed therebetween, and thereby made harmless. There has also been known another exhaust gas purifying device in which monolithic catalyzing element consisting of a monolithic ceramic carrier and metal catalyst carried thereto is used, and such purifying device is disclosed in U.S. Pat. Nos. 3,441,381 and 3,441,382. The monolithic ceramic carrier is provided with openings at its respective ends and a plurality of exhaust gas passages defined therein. The device utilizing the monolithic catalyzing element is advantageous as compared with the device utilizing the pellet type catalyzers, from the standpoints that the monolithic catalyzing element is not subjected to wear and deterioration due to its vibration, and that construction of a housing receiving the catalyzing element can be made simple. However, this device has a disadvantage such that the monolithic catalyzing element will collide with the housing due to its vibration transmitted from engine and thereby be damaged, if suitable cushioning materials should not be filled in a space between an inner wall surface of the housing and an outer periphery of the catalyzing element. Because, generally, the difference of heat expansion coefficients between the metal housing and the monolithic catalyzing element is fairly large, so that the space between the inner wall surface of the housing and the outer periphery of the catalyzing element will be considerably expanded when the device is subjected to high temperature. It will be easily understood that such expansion of the space will cause the catalyzing element to vibrate and thereby to collide with the housing.

In order to eliminate aforementioned disadvantage, the device of the U.S. Pat. No. 3,441,381 employs metal fabric filled in a space between the inner wall surface of the housing and the outer periphery of the monolithic catalyzing element as cushioning material. Further, in the device of the U.S. Pat. No. 3,441,382, the monolithic catalyzing element is held by means of a spring through heat insulating material made of ceramic. The device of the U.S. Pat. No. 3,441,381 is effective when it is used under a condition that the metal fabric may not be subjected to high temperature, so that elasticity of the fabric may not be lost. However, in case that the latter device should be used in engines of automobiles or the like, which may be operated under a variety of load conditions, temperature of the metal fabric reaches several hundreds degrees (°C) under high load high rotating operation. When the metal fabric is subjected to such high temperature, it loses its elasticity, so that cushioning effects of the metal fabric may be lost. This leads to damage of the monolithic catalyzing element as previously described. Further, the device of the U.S. Pat. No. 3,441,382 has a disadvantage such that it is complex in construction and will be high in manufacturing cost.

SUMMARY OF THE INVENTION

It is therefore a primary object of the present invention to provide a catalyst-type exhaust gas purifying device in which hereinbefore described disadvantages are eliminated and the damage of the monolithic catalyzing element can be prevented.

According to the present invention, there is provided a catalyst-type exhaust gas purifying device in which heat insulating spaces are provided near the outer periphery of the monolithic catalyzing element. The device of the present invention, constructed as above, can considerably reduce heat transmission from the outer periphery of the monolithic catalyzing element to a space filled with metal fabric, so that temperature of the metal fabric can be maintained low and the loss of elasticity of the metal fabric can be prevented.

The above object and other objects as well as the characteristic features of the invention will become apparent and more readily understandable by the following description and the appended claim when read in conjunction with the accompanying drawings.

DETAILED DESCRIPTION OF THE PREFERRED EMBODIMENT

Figure 1:
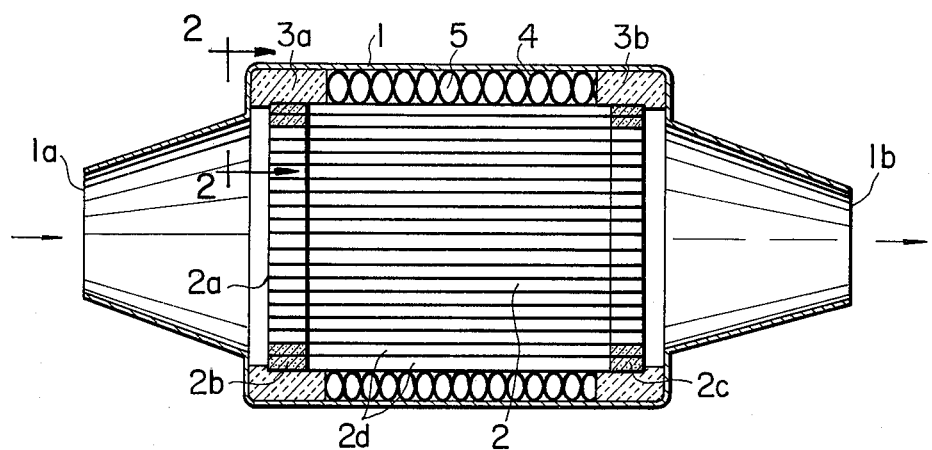
FIG. 1 is a longitudinal section view of an embodiment of a catalyst-type exhaust gas purifying device of the present invention.
Figures 2, 3:
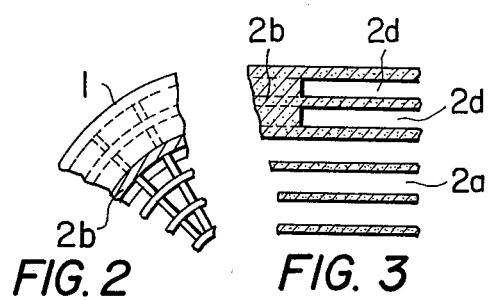
FIG. 2 is a partial sectional view of monolithic catalyzing element for use in the present invention along the lines 2—2 in FIG. 1.
FIG. 3 is a fragmentary transverse section.

In the figures, a cylindrical metal housing 1 is provided at its respective ends with an exhaust gas inlet 1a and an exhaust gas outlet 1b. A monolithic catalyzing element 2 comprising a monolithic ceramic carrier is disposed within the housing 1. The catalyzing element 2 is provided with a plurality of exhaust gas passages 2a therein, and on the inner wall surfaces of the passages 2a are attached metal catalysts. At least one circumferential row of bores closed at the opposite ends by means of partition walls 2b and 2c are provided near the outer periphery of the catalyzing element 2. The circumferential row of bores provide heat insulating spaces 2d. The partition walls 2b and 2c are made of the same material as the ceramic carrier or of other materials such as cement, and they are made integral with the ceramic carrier. A metal fabric 4 is forcibly received in a space 5 defined between the housing 1 and the outer periphery of the catalyzing element 2 for preventing damage of the device due to collision of the catalyzing element 2 with the housing 1 when the catalyzing element 2 is vibrated. Heat insulating cushioning materials 3a and 3b made of ceramic fibres are forcibly fitted in those portions of the space 5 which are near the ends of the housing 1 in order to prevent exhaust gas of high temperature from flowing into the metal fabric 4.

In the purifying device constructed as above, exhaust gas is introduced through the inlet 1a. Then the exhaust gas passes through the catalyzing element 2. Harmful components in the exhaust gas are oxidized while passing through the catalyzing element 2. The exhaust gas is discharged through the outlet 1b after passing through the catalyzing element 2. The catalyzing element 2 will be heated to high temperature due to the oxidation reaction, however, transmission of the produced heat to the metal fabric 4 and the housing 1 is prevented by the heat insulating spaces 2d.

As hereinbefore described, in the purifying device of the present invention, heat insulating spaces 2d are provided near the outer periphery of the catalyzing element 2, so that heat transmission from the passages 2a, through which the exhaust gas of high temperature passes to the outer periphery of the catalyzing element 2 and the housing 1, can be greatly reduced. Since, in the device of the present invention, the metal fabric 4 is not subjected to high temperature, the loss of elasticity of the metal fabric 4, and thus the loss of its performance to hold the catalyzing element 2 can be prevented. Therefore, the damage of the catalyzing element 2 due to its vibration can be prevented.

We claim:

1. A catalyst-type exhaust gas purifying device comprising:
    a housing having an exhaust gas inlet and an exhaust gas outlet at its opposite ends,
    a monolithic catalyzing element disposed within said housing so as to define between the ends of the element an annular space between an outer peripheral surface of said catalyzing element and an inner peripheral surface of said housing, said catalyzing element including therein a plurality of elongated spaces extending parallel to a flow axis of said housing, and
    a metal fabric in said annular space extending between said ends and short thereof, and supporting said catalyzing element,
    both ends of those of said elongated spaces which are located at the outer circumferential part, including at least the outermost circumferential part, of said catalyzing element being filled with exhaust gas blocking material consisting of ceramic material, said blocking material extending into said elongated spaces at the outer circumferential part and sealing the ends thereof, said blocking material at each end of each said blocked elongated space being longitudinally spaced from the blocking material at the other end thereof, whereby said sealed elongated spaces at said outer circumferential part provide at least one annular layer of heat insulating spaces and the remainder part of said elongated spaces provide exhaust gas passages.

2. A catalyst-type exhaust gas purifying device according to claim 1, wherein said monolithic catalyzing element is made of the same ceramic material as said blocking material.

3. A catalyst-type exhaust gas purifying device according to claim 1, further comprising annular sealing members made of ceramic fibers disposed in said annular space and at the opposite ends of said metal fabric in the space not taken by said fabric, said sealing member being effective to prevent exhaust gases from flowing into said metal fabric.

* * * * *